United States Patent
Stancil et al.

[11] Patent Number: 6,065,081
[45] Date of Patent: May 16, 2000

[54] ADMINISTRATOR CONTROLLED ARCHITECTURE FOR DISABLING ADD-IN CARD SLOTS

[75] Inventors: Charles J. Stancil, Tomball; James M. Mann, Cypress; Brant W. Jones, The Woodlands, all of Tex.

[73] Assignee: Compact Computer Corp., Houston, Tex.

[21] Appl. No.: 09/069,040

[22] Filed: Apr. 29, 1998

[51] Int. Cl.[7] .............................. G06F 13/00; G06F 13/40
[52] U.S. Cl. .......................................... 710/104; 710/102
[58] Field of Search ............................. 710/3, 8, 15, 104, 710/100, 62, 102, 103, 108; 713/1, 100, 202, 300; 380/23, 25; 714/38; 340/825.31; 711/164

[56] References Cited

U.S. PATENT DOCUMENTS

| | | | |
|---|---|---|---|
| 5,109,517 | 4/1992 | Houda et al. ........................... | 710/104 |
| 5,377,343 | 12/1994 | Yaezawa ................................. | 711/164 |
| 5,388,156 | 2/1995 | Blackledge, Jr. et al. ................... | 380/4 |
| 5,421,006 | 5/1995 | Jablon et al. ............................. | 714/36 |
| 5,451,934 | 9/1995 | Dawson et al. ..................... | 340/825.31 |
| 5,533,125 | 7/1996 | Bensimon et al. ........................... | 380/4 |
| 5,537,540 | 7/1996 | Miller et al. .............................. | 714/38 |
| 5,574,514 | 11/1996 | Tanihira et al. ........................ | 348/706 |
| 5,692,189 | 11/1997 | Lipe ........................................... | 713/1 |
| 5,797,032 | 8/1998 | Boccon-Gibod ........................... | 710/9 |

OTHER PUBLICATIONS

"Network PC System Design Guidelines", by Compaq, Dell, Hewlett Packard, Intel and Microsoft Corp., Version 1.0b, Aug. 7, 1997.

"PCI Bus Power Management Interface Specification", Version 1.0, Jun. 30, 1997, PCI Local BUS, 65 pages.

*Primary Examiner*—Gopal C. Ray
*Attorney, Agent, or Firm*—Matthew S. Anderson

[57] ABSTRACT

A system and method for disabling add-in card slots (e.g. PCI or ISA) in a computer system. The slots may be enabled or disabled, according to the preferred embodiment, only after the user has entered a System Administrator password. This password is stored in a non-volatile memory within the computer system, so it is less vulnerable to attack through removal of the power line or battery from the system. The preferred system provides that devices attached to disabled slots are invisible to the operating system.

20 Claims, 2 Drawing Sheets

ADMINISTRATOR CONTROLLED ARCHITECTURE FOR DISABLING ADD-IN CARD SLOTS

BACKGROUND AND SUMMARY OF THE INVENTION

This application relates to systems and methods to control a user's ability to add additional hardware to a computer system.

Background: User Management

Current computer system architectures make it very easy for users to insert or remove components (e.g. storage devices, network cards, modems, etc.) without assistance from a technical expert. However, this is not an unmixed blessing. If adventuresome users create problems by changing the hardware configuration of their machines, those problems may have to be fixed by a network administrator or maintenance technician. The costs of uncontrolled user changes are one reason why the lifetime costs of a personal computer, in a corporate environment, is typically many times the initial purchase cost. For this reason, corporate system administrators often desire absolute control over their end users' ability to add or remove option cards from their PCs.

In a corporate environment system administrators often desire absolute control over their end users' ability to add option cards to their PCs. The corporation may have an approved list of acceptable add-in cards which they wish to install under their control. Alternatively, they may not want any add-in cards installed by the end user; such end-user "upgrades" can lead to configuration issues and subsequent support time that translates into unnecessary, inflated costs of ownership.

Typical solutions include physically locking the system case or fastening it shut, but these solutions incur significant overhead expense. Key management is costly both in terms of time and storage space, or means the expense of individually coding the locks of each system. Any means of fastening the case shut necessarily means a trade-off between resistance to unauthorized access and the time and inconvenience required to open the box when an authorized repair or change to the hardware is required. Unfortunately, either solution may circumvented by the user, in many cases, without undue difficulty or damage to the system.

Innovative System Management Technique and Method

This application discloses an innovative system and method for disabling add-in card slots (e.g. PCI or ISA) in a computer system. The slots may be enabled or disabled, according to the preferred embodiment, only after the user has entered a System Administrator password. This password is stored in a non-volatile memory within the computer system, so it is less vulnerable to attack through removal of the power line or battery from the system. The preferred embodiment provides that devices attached to disabled slots are invisible to the operating system.

Particular Advantages of the Preferred Embodiment

The innovative system and method provides many advantages, as would be seen by one of ordinary skill in the art. These include, but are not limited to:

Ease of management over conventional methods. The disclosed embodiments, which use a password-controlled access system, are much easier to manage than systems which are physically locked or fastened shut. Key management is reduced or eliminated, as well as the need for special tools to open a box which has been fastened shut. Further, a common administrator password can be used for multiple systems, eliminating much of the trouble of a password-management system.

Power consumption to a device installed in a disabled slot is significantly reduced. Note that using a slot specific IDSEL (PCI ID select signal) instead of RST# on a PCI bus, as described below, leads to even lower power consumption since the device can be placed in the $D3_{hot}$ state.

By disabling a slot, it is possible to hide an installed device from the operating system so that it is never enumerated and therefore never subsequently configured. Although it is possible for BIOS to disable a device (e.g. through PCI configuration space) the operating system's bus enumerator can still find the device and re-enable it. This is problematic when it is absolutely necessary to disable a built-in device (e.g. on-board NIC) in order for another device of the same type (e.g. add-in card NIC) to function properly, or to absolutely prevent a user from activating a device.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

This application discloses an innovative system and method for disabling add-in card slots (e.g. PCI or ISA) in a computer system. The slots may be enabled or disabled, according to the preferred embodiment, only after the user has entered a System Administrator password. This password is stored in a non-volatile memory within the computer system, so it is less vulnerable to attack through removal of the power line or battery from the system. The preferred embodiment provides that devices attached to disabled slots are invisible to the operating system.

Separate configuration select (for PCI only) or reset (for PCI or ISA) signals are created for each slot. These slot-specific signals can be individually controlled so that they are continually forced to their disabling state (reset asserted or configuration select negated). In the case of a slot-specific configuration select this has the effect of blocking any accesses to the PCI device's configuration space. In the case of using a slot-specific reset signal the effect is to keep an installed card in its initial state thereby rendering it inactive on its native bus. The controlling mechanism consists of a General Purpose Input/Output (GPIO) signal which is accessed securely using a System Administrator password. Exemplary logic structures for PCI and ISA slots are discussed below with relation to the figures.

Figure 1:
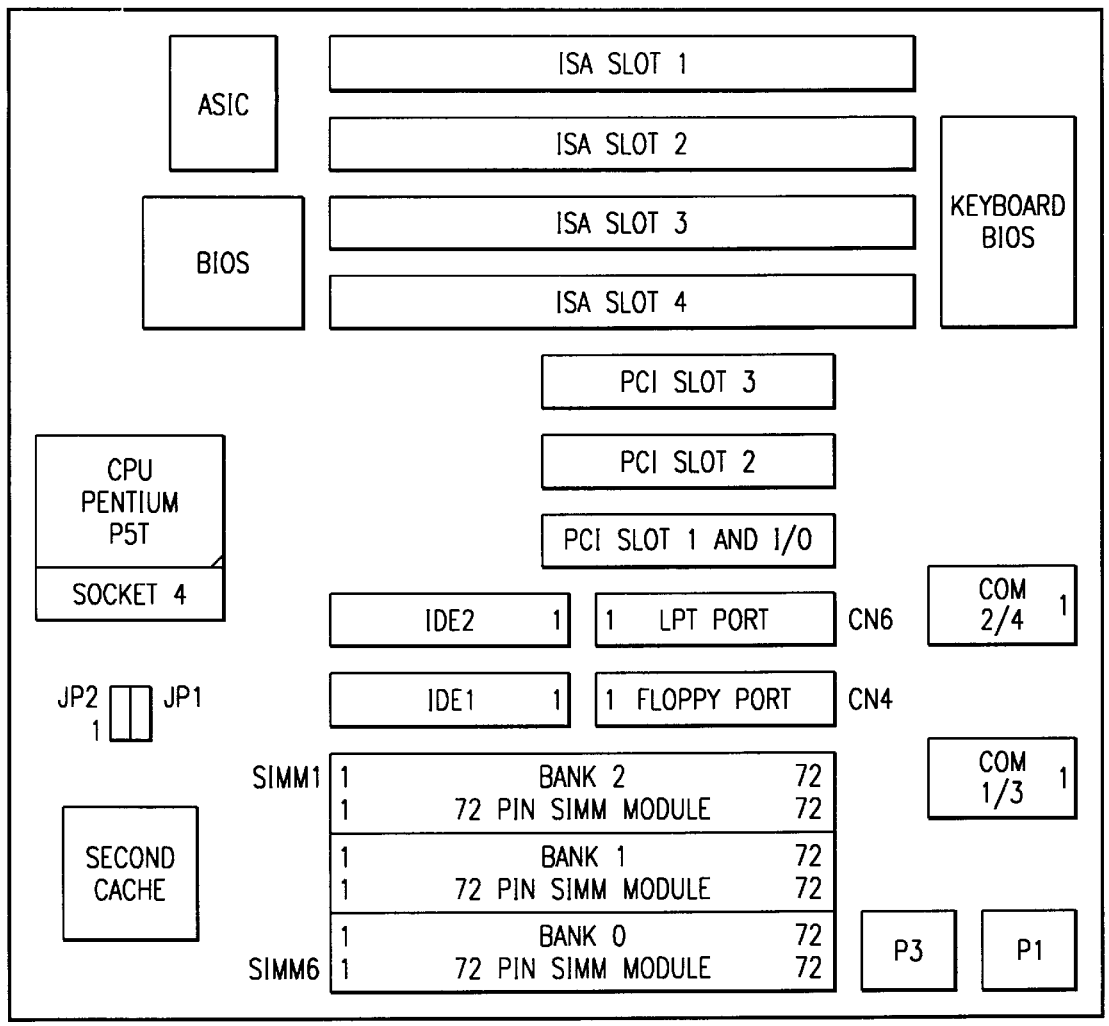
FIG. 1 shows a motherboard with ISA and PCI add-in slots.

FIG. 1 shows a sample motherboard with PCI and ISA add-in slots. Also shown are sockets for the CPU, BIOS, Keyboard BIOS, and other devices. Connections for disk drives and other peripherals, as well as sockets for memory modules, are also shown.

Figure 2:
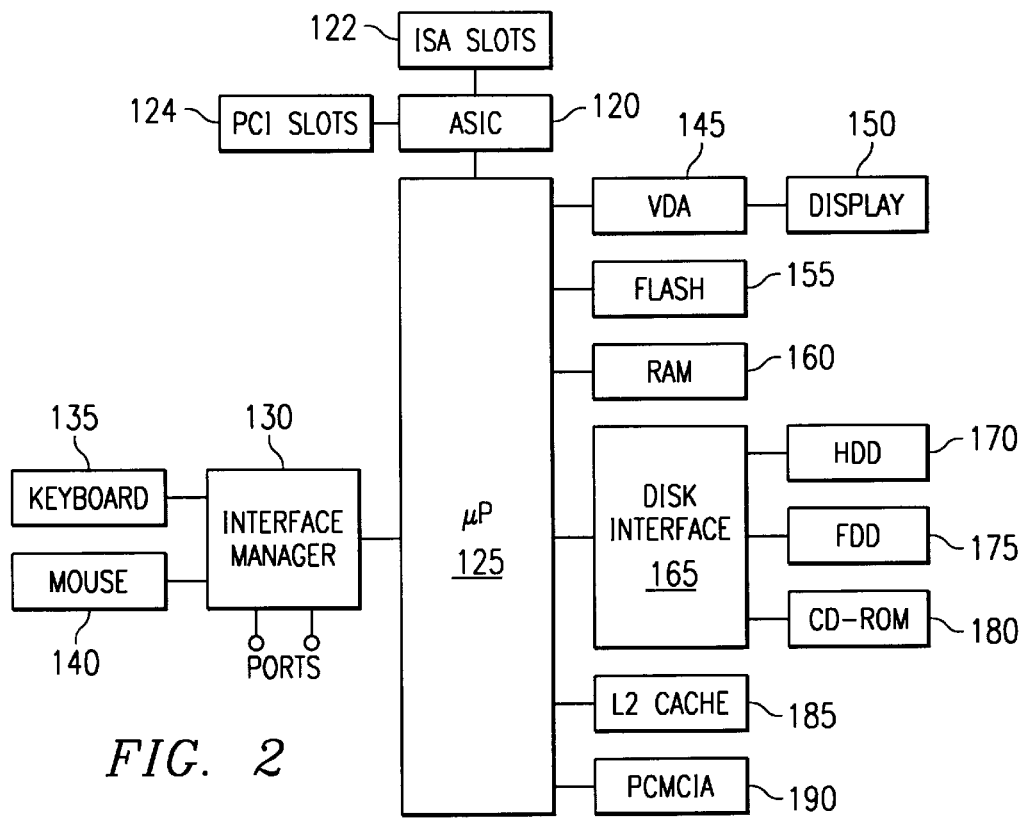
FIG. 2 shows a block diagram of a computer system according to the presently preferred embodiment.

FIG. 2 shows a block diagram of a computer system with an administrative system according to the presently preferred embodiment. The complete computer system includes, in this example:

user input devices (e.g. keyboard 135 and mouse 140);

an ASIC 120 with non-volatile memory, capable of storing configuration data, and connected to disable ISA slots 122 and PCI slots 124.

at least one microprocessor 125 which is operatively connected to receive inputs from said input device, through an interface manager chip 130 (which also provides an interface to the various ports) and from said receiver;

a memory (e.g. flash memory 155 and RAM 160), which is accessible by the microprocessor;

a data output device (e.g. display 150 and display driver card 145) which is connected to output data generated by microprocessor; and a magnetic disk drive 170 which is read-write accessible, through an interface unit 165, by the microprocessor.

Optionally, of course, many other components can be included, and this configuration is not definitive by any means.

PCI Implementations

Figure 3:
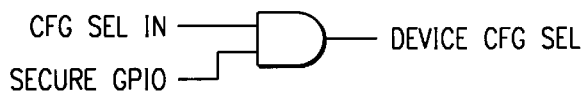
FIG. 3 shows a circuit diagram for disabling a PCI-bus device.

A simple "AND" function with an active low disable signal suffices for an active high configuration select or an active low reset signal, as shown in FIG. 3. The control of the GPIO can be done during the boot process through a pre-OS interface. While the scope of the invention encompasses virtually any password scheme, the preferred embodiment would be a per-slot enable/disable bit residing in NVRAM which could only be accessed under password control using the Compaq "Black Box." These bits would preferably reside in an EEPROM-type of device rather than battery-backed NVRAM so that the settings could not be defeated if battery power failed or was removed.

PCI Function Power States

The options for handling PCI add-in cards have different power consumption implications. The PCI Bus Power Management Interface Specification Revision 1.0, which is hereby incorporated by reference, describes several powers states, D0–D3, with D0 being the maximum powered state, and D3 being the minimum powered state. D1 and D2 power management states enable intermediate power savings states between the D0 (on) and D3 (off) power management states. A "PCI Function," as discussed below, refers to a set of functionality inside a PCI device, represented by one 256-byte configuration space. Each PCI function within a device generally has a separate software driver. A "PCI Device" is a physical device consisting of one load on the PCI bus and having only one IDSEL input. A PCI device may contain up to eight PCI functions.

A PCI function must initially be put into the D0 power management state before being used. Upon entering D0 from power on reset, or transition from $D3_{hot}$, the function will be in an uninitialized state. Once initialized by the system software, the function will be in the D0 active state. A reset will force all PCI functions to the uninitialized D0 state. Legacy PCI devices, built prior to the release of the PCI PMI specification, are assumed to be in D0 whenever power is applied to them.

The D3 power management state constitutes a special category of power management state in that a function could be transitioned into D3 either by software, or by physically removing power from its host PCI device. In that sense, the two D3 variants have been designated as $D3_{hot}$ and $D3_{cold}$ where the subscript refers to the presence or absence of Vcc respectively. Functions in $D3_{hot}$ can be transitioned to an uninitialized D0 state via software by writing to the function's PMCSR register or by having its Bus Segment Reset (PCI RST#) asserted. Functions in the $D3_{cold}$ state can only be transitioned to an uninitialized D0 state by reapplying Vcc and asserting Bus Segment Reset (RST#) to the function's host PCI device. Note that the only permitted state transition from either $D3_{hot}$ or $D3_{cold}$ is to D0.

The preferred embodiment utilizes two PCI power management states:

1. D0
2. $D3_{hot}$

The first option would be used if a slot-specific RST# approach was taken. This will yield a power consumption level that is less than 10 watts according to the PCI Power Management specification (PCI max power is 25W). This is referred to as D0 uninitialized in the specification. The second option would apply if a slot-specific configuration select (i.e. IDSEL) was implemented. In this case the power consumption would be less than that of the D0 uninitialized state; however, a value is not stated in the PCI PM spec. In this latter case BIOS could temporarily enable the slot during POST. If a device is found which supports PCI PM then the BIOS could place the device in the $D3_{hot}$ state. The BIOS would then disable the slot so that the device would not be found when the OS loads.

ISA Implementations

Figure 4:
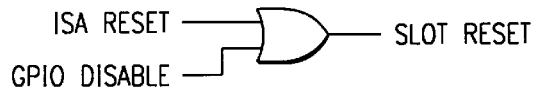
FIG. 4 shows a circuit diagram for disabling an ISA-bus device.

Implementing this function in an ISA slot is a much easier proposition, since ISA connections are less complex. An "OR" function with an active high disable signal would be used for an active high reset (e.g. ISA's RESDRV). As shown in FIG. 4, the reset pin of the ISA slot is connected in a wired OR configuration both to the ISA reset signal and to a GPIO disable signal controlled by the system BIOS and the authentication circuit. In this case, when the slot is to be disabled, the reset signal is forced to remain continually high, which prevents the attached device from ever initializing or being recognized or used by the system.

Common Implementation Factors

Preferably this authentication circuit is implemented using a "black box" security controller chip, as described in the U.S. application 08/398,343 of Zinsky, Shaver, Kaiser and Rawlins, entitled "Security Control for Personal Computer" (filed Mar. 3, 1995), which is hereby incorporated by reference. However, this function could be accomplished using an ASIC or by other means which provide for controlled access by an administrator to selectively activate a disable signal.

Timing on the reset signal is non-critical since it is an asynchronous signal. Intercepting other bus signals could cause timing violations. Thus care must be taken if slot-specific IDSEL is implemented for PCI slots.

Figure 5:
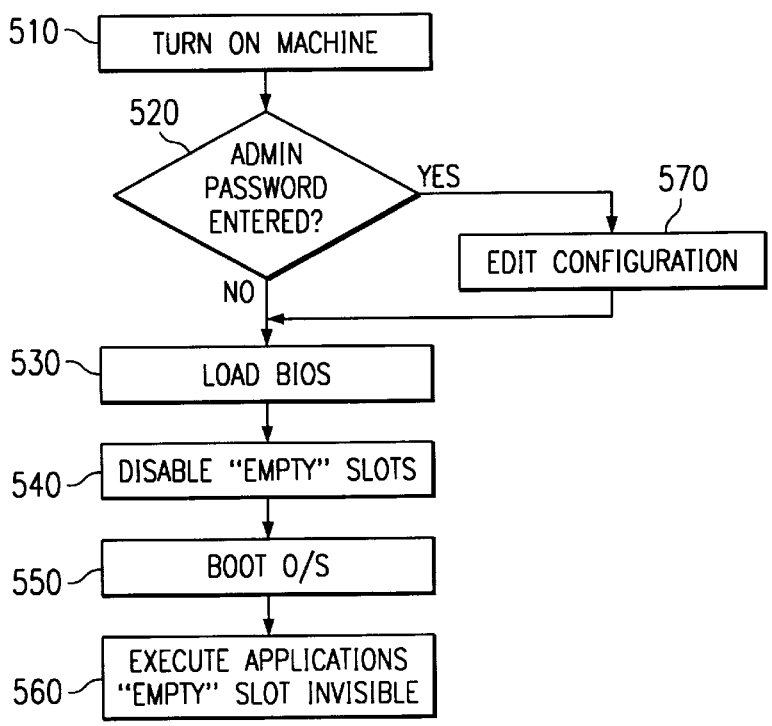
FIG. 5 shows a flowchart of the operation of the preferred embodiment.

FIG. 5 shows a flowchart of the operation of the preferred embodiment. When the system is started (step 510), the user is given the opportunity to enter an administrator password (step 520). If this password is entered, the user may then change the configuration of enabled and disabled slots (among many other possible configuration changes), by indicating which slots should be designated as "empty" (step 570). After this step, or if the administrator password is entered, the BIOS system is loaded (step 530), and the slots are enabled or disabled according to the configuration stored in non-volatile memory. Next, the operating system is started (step 550). The user may the execute his applications as normal, but any slots that are configured as "empty" will be continually disabled, and will be invisible to the operating system (step 560).

One advantage of the preferred embodiments is low power consumption in the case where a device is installed in a disabled slot. Note that using a slot specific IDSEL instead of RST# on PCI leads to even lower power consumption since the device can be placed in the $D3_{hot}$ state.

Another advantage of the preferred embodiments lies in hiding an installed device from the operating system so that it is never enumerated and thus subsequently configured. Although it is possible for BIOS to disable a device (e.g. through PCI configuration space) the operating system's bus enumerator can still find the device and re-enable it. This is problematic when it is absolutely necessary to disable a built-in device (e.g. on-board NIC) in order for another device of the same type (e.g. add-in card NIC) to function properly.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A computer system, comprising:
   a user input device, a microprocessor which is operatively connected to detect inputs from said input device, random-access memory which is connected to be read/write accessible by said microprocessor, and an output device operatively connected to receive outputs from said microprocessor;
   a power supply connected to provide power to said microprocessor and said memory;
   a non-volatile memory for storing configuration information; and
   at least one bus connection, controlled by said microprocessor, configured to receive peripheral devices;
   wherein said bus connection can be selectively disabled according to said configuration information, and thereafter any said peripheral devices connected to said bus connection are invisible to said system.

2. The system of claim 1, wherein said bus connection is a PCI bus connection.

3. The system of claim 1, wherein said bus connection is an ISA bus connection.

4. The system of claim 1, wherein said bus connection is disabled by forcing a reset signal to be asserted on said bus connection.

5. The system of claim 1, wherein said bus connection is disabled by forcing said bus connection to a defined power-off state.

6. A computer system, comprising:
   at least one input device and at least one output device;
   a main system module which does not include said input and output devices, and which includes therein: at least one microprocessor which is operatively connected to detect inputs from said input device and to send data to said output device, and random-access memory which is connected to be read/write accessible by said microprocessor;
   a bus connected to said main system module, and having connections through which additional modules can communicate with said main system module; and
   a control circuit connected to selectively disable at least one of said connections according to settings in a non-volatile memory;
   wherein said disabled connections are invisible to said main system module.

7. The system of claim 6, wherein said connection is a PCI slot.

8. The system of claim 6, wherein said connection is an ISA slot.

9. The system of claim 6, wherein said connection is disabled by forcing a reset signal to be asserted on said additional modules.

10. The system of claim 6, wherein said additional modules are selectively disabled by forcing said connection to a defined power-off state.

11. A method for controlling user customization of a computer system, comprising the steps of:
  (a.) when said computer system is turned on, determining which of a plurality of add-in slots are defined as empty by an administrative configuration;
  (b.) sending a signal to each of said defined empty slots to disable said slots; and
  (c.) during operation of said system, ignoring any devices attached to said disabled slots.

12. The system of claim 11, wherein at least one of said slots is a PCI bus connection.

13. The system of claim 11, wherein at least one of said slots is an ISA bus connection.

14. The system of claim 11, wherein said defined empty slots are disabled by forcing a reset signal to be asserted on said defined empty slots.

15. The system of claim 11, wherein said defined empty slots are disabled by forcing said defined empty slots to a defined power-off state.

16. A method for controlling user customization of a computer system, comprising the steps of:
  (a.) when said computer system is turned on, allowing a user to selectively enter an administrative mode by entering a password;
  (b.) if the user has entered said administrative mode, allowing user to change an administrative configuration of enabled and disabled slots;
  (c.) thereafter determining which of a plurality of add-in slots are defined as empty by said administrative configuration;
  (d.) sending a signal to each of said defined empty slots to disable said slots; and
  (e.) during operation of said system, ignoring any devices attached to said disabled slots.

17. The system of claim 16, wherein at least one of said slots is a PCI bus connection.

18. The system of claim 16, wherein at least one of said slots is an ISA bus connection.

19. The system of claim 16, wherein said defined empty slots are disabled by forcing a reset signal to be asserted on said defined empty slots.

20. The system of claim 16, wherein said defined empty slots are disabled by forcing said defined empty slots to a defined power-off state.

* * * * *